(12) United States Patent
Benz et al.

(10) Patent No.: US 8,476,390 B2
(45) Date of Patent: Jul. 2, 2013

(54) LIGHT FILTERS COMPRISING P-NITROPHENYLAZO SALICYLIC ACID DERIVATIVES THEREOF

(76) Inventors: Patrick H. Benz, Sarasota, FL (US); Jose A. Ors, Sarasota, FL (US)

(*) Notice: Subject to any disclaimer, the term of this patent is extended or adjusted under 35 U.S.C. 154(b) by 616 days.

(21) Appl. No.: 12/597,304

(22) PCT Filed: Apr. 25, 2008

(86) PCT No.: PCT/US2008/061634
§ 371 (c)(1),
(2), (4) Date: Jun. 3, 2010

(87) PCT Pub. No.: WO2008/134555
PCT Pub. Date: Nov. 6, 2008

(65) Prior Publication Data
US 2010/0256306 A1    Oct. 7, 2010

Related U.S. Application Data

(60) Provisional application No. 60/914,597, filed on Apr. 27, 2007.

(51) Int. Cl.
C08F 12/32    (2006.01)
C09B 46/00    (2006.01)
F21V 9/06     (2006.01)
C02B 1/04     (2006.01)

(52) U.S. Cl.
USPC ........ 526/312; 523/106; 525/328.4; 534/851; 252/589

(58) Field of Classification Search
USPC ........ 534/851; 526/312; 523/106; 525/328.4; 252/589
See application file for complete search history.

(56) References Cited

U.S. PATENT DOCUMENTS

| | | | |
|---|---|---|---|
| 3,190,874 A * | 6/1965 | Skoultchi et al. | ............. 534/643 |
| 4,952,046 A | 8/1990 | Stephens et al. | |
| 5,532,289 A | 7/1996 | Benz et al. | |
| 5,891,932 A | 4/1999 | Benz et al. | |
| 6,011,081 A | 1/2000 | Benz et al. | |
| 6,096,799 A | 8/2000 | Benz et al. | |
| 6,242,508 B1 | 6/2001 | Benz et al. | |
| 6,245,830 B1 | 6/2001 | Benz et al. | |

(Continued)

FOREIGN PATENT DOCUMENTS

| | | |
|---|---|---|
| CA | 2 603 665 A1 | 10/2006 |
| EP | 1 293 541 A2 | 3/2003 |
| JP | 2-232056 | 9/1990 |
| WO | WO 95/11279 | 4/1995 |

OTHER PUBLICATIONS

Allcock, H. et al., Contemporary Polymer Chemistry, vol. 23, No. 5, *Table of Contents*, Prentice Hall (1982).
Billmeyer, Jr., F. et al., Textbook of Polymer Science, 3rd Ed., *Table of Contents*, Wiley-Interscience (1984).

(Continued)

*Primary Examiner* — Fred M Teskin
(74) *Attorney, Agent, or Firm* — Foley & Lardner LLP (57) ABSTRACT

Polymer and monomer compositions based on a chromophore and improved light absorption. Lens materials can be fabricated. A composition comprising: a compound comprising a polymerizable vinyl group covalently linked to a benzene ring-based chromophore comprising: a substituent comprising a carbonyl group at the 1-position; a substituent comprising a hydroxy, ether, ester or a combination thereof at the 2-position; and a substituent comprising a (p-Nitrophenylazo) group at the 4 position of the benzene ring, including salts.

32 Claims, 10 Drawing Sheets

U.S. PATENT DOCUMENTS

| | | | |
|---|---|---|---|
| 6,265,465 | B1 | 7/2001 | Benz et al. |
| 6,267,784 | B1 | 7/2001 | Benz et al. |
| 6,353,069 | B1 | 3/2002 | Freeman et al. |
| 6,517,750 | B2 | 2/2003 | Benz et al. |
| 6,555,598 | B2 | 4/2003 | Benz et al. |
| 6,566,417 | B2 | 5/2003 | Benz et al. |
| 6,599,959 | B2 | 7/2003 | Benz et al. |
| 6,627,674 | B2 | 9/2003 | Benz et al. |
| 7,067,602 | B2 | 6/2006 | Benz et al. |
| 7,387,642 | B2 | 6/2008 | Benz et al. |
| 2006/0199929 | A1 | 9/2006 | Benz et al. |
| 2006/0252844 | A1 | 11/2006 | Mentak |
| 2008/0081851 | A1 | 4/2008 | Benz et al. |
| 2008/0242818 | A1 | 10/2008 | Benz et al. |

OTHER PUBLICATIONS

March, J., March's Advanced Organic Chemistry, Reactions, Mechanisms, and Structure, $5^{th}$ Ed., *Table of Contents*, Wiley-Interscience (2001).

Shuhaibar, K., "The Synthesis and Characterization of UV-Absorbing Azo-Pigments and Their Polymerizable Acryloyloxy and Methacryloyloxy Derivatives," Dyes and Pigments, 1992, vol. 18, pp. 125-136.

International Search Report and Written Opinion mailed Apr. 17, 2010 in International Application No. PCT/US2008/061634.

International Preliminary Report on Patentability mailed Nov. 5, 2009.

\* cited by examiner

LIGHT FILTERS COMPRISING P-NITROPHENYLAZO SALICYLIC ACID DERIVATIVES THEREOF

PRIORITY

This application claims priority to U.S. Application Ser. No. 60/914,597, filed Apr. 27, 2007, which is incorporated by reference in its entirety for all purposes.

BACKGROUND

There have been a variety of proposed dyes for use as polymerizable compounds to affect the colorization of optical plastics for lenses and ocular devices. Most of these relate to various diphenyl azo or triphenyl diazo compounds and generally claim to provide UV protection as well as blue light blocking capability because of their absorption of light in the 400-500 nm range. Because the human crystalline lens is pale yellow in color in young people and darker yellow to brownish yellow color in older people, these dyes serve the purpose of providing UV protection in addition to blue light filtering capability.

A need exists to provide, for example, discrete structures which absorb light below 500 nm or to a greater extent in the 400 nm to 500 nm range in order to more closely resemble the light filtering characteristics of the human crystalline lens of aged persons.

SUMMARY

The present embodiments provide compounds, compositions, polymers, articles, methods of making, and methods of using. Monomer chromophores are derived herein from p-Nitrophenylazo salicylic acid, ester or ketone structures. Alternatively, monomer chromophores are derived herein from 2-Hydroxy-4(p-Nitrophenylazo)benzoic acid.

For example, one embodiment comprises a composition comprising a compound comprising a polymerizable vinyl group covalently linked to a benzene ring-based chromophore comprising a substituent comprising a carbonyl group at the 2-position, a substituent comprising a hydroxy, ether, ester or a combination thereof at the 1-position and a substituent comprising a (p-nitrophenylazo) group at the 4-position of the benzene ring, and salts thereof.

Another embodiment comprises a composition comprising: a compound comprising a polymerizable vinyl group covalently linked to a benzene ring-based chromophore comprising a carboxylic acid, ester or ketone at the 2-position, a substituted or unsubstituted hydroxy group at the 1-position, and a p-nitrophenylazo group at the 4-position, and salts thereof.

Another embodiment provides a composition comprising: a polymer comprising a polymer backbone and at least one side group, wherein the side group comprises a benzene ring-based chromophore comprising a substituent comprising a carbonyl group at the 2-position, a substituent comprising a hydroxy, ether, ester or a combination thereof at the 1-position and a substituent comprising a (p-Nitrophenylazo) group at the 4-position of the benzene ring, and salts thereof.

Another embodiment provides a method of making comprising: providing a polymerization monomer according to any one of the embodiments, optionally providing at least one additional polymerization monomer and polymerizing the polymerization monomers.

Another embodiment provides an optical lens material comprising polymerization monomer according to one of the aforementioned embodiments. For example, the optical lens material can comprise a benzene-ring base chromophore comprising a polymerizable vinyl group. In a further embodiment, said polymerization monomer is copolymerized with another different polymer comprising an acrylate, styrene or both moieties.

Another embodiment provides a composition comprising: a water content from about 25 to about 26 percent, a refractive index from about 1.506 to about 1.511, a linear expansion of about 1.125, a radial expansion of about 1.125, a tensile stress from about 62 to about 92 g/mm$^2$ and a Young's Modulus from about 33 to about 95 g/mm$^2$.

Another embodiment provides a use of a polymerization monomer upon polymerization in optical lens materials.

Yet another embodiment provides a method of making an ophthalmic lens or device comprising: providing a polymerization monomer, optionally providing at least one additional polymerization monomer and polymerizing the polymerization monomer.

Advantages include a synthetically diverse system which can be tuned to particular applications and compounds which bear moieties which result in filtering properties similar to or substantially the same as that of an aged human crystalline lens. For example, fine shades of filtering that can be tuned and which are not provided with conventional UV-blockers.

DETAILED DESCRIPTION

Introduction

All references cited herein are incorporated by reference herein in their entirety.

Compounds described herein include both D- and L-forms, and mixtures thereof, as well as salts and solvates, unless otherwise specified.

Lens materials including polymeric hydrophilic and hydrophobic lens materials are known in the art. For example, U.S. Pat. Nos. 5,532,289; 5,891,932; 6,011,081; 6,096,799; 6,242,508; 6,245,830; 6,265,465; 6,555,598; 6,566,417; 6,599,959; and 6,627,674 describe contact lens material, monomers, crosslinkers, hydrogels, and methods of making the same. Improved properties of said lenses include improved mechanical strength, water retention and dimensional stability. Additional information and products can be obtained from Benz R&D (Sarasota, Fla.).

U.S. Pat. Nos. 6,267,784, 6,517,750 and 7,067,602 describe intraocular lens (IOL) materials and methods of making the same. The IOL may be a one piece unit with an optic portion and a haptic portion. The IOL materials can be formed with methacrylate monomers such as alkoxy-alkyl-methacrylate. Some of the improved properties include, good water retention and dimensional stability. Also described are IOL materials additionally enhanced with crosslinking agents and UV absorbents.

U.S. application Ser. No. 11/416,351 (now patented as U.S. Pat. No. 7,947,796), Ser. No. 11/402,642 (now patented as U.S. Pat. No. 7,387,642), Ser. No. 11/849,234 (now abandoned) and Ser. No. 12/042,317 (now patented as U.S. Pat. No. 8,026,326) describes lens materials and methods of making and using the same. The lens materials in Ser. No. 12/042,317 include kynurenine, a different chromophore from the present application, and derivatives thereof.

Polymers, crosslinked polymers, copolymers, terpolymers, hydrogels, interpenetrating polymer networks, random versus block microstructures, oligomers, monomers, methods of polymerization and copolymerization, molecular weight, measurements, and related materials and technologies are generally known in the polymer arts and can be used in the practice of the presently described embodiments. See, for example, (1) *Contemporary Polymer Chemistry*, Allcock and Lamp, Prentice Hall, 1981, and (2) *Textbook of Polymer Science*, 3$^{rd}$ Ed., Billmeyer, Wiley-Interscience, 1984. Free radical polymerization can be used to prepare the polymers herein.

Suitable monomers for the polymers include polymerizable vinyl groups. However, other polymerizable groups known in the art to create other hydrophilic or hydrophobic polymers are also suitable.

Hydration of crosslinked polymers is known in the art in various technologies including hydrogel, membrane, and lens materials.

The term (meth)acrylate refers to both methacrylate or acrylate embodiments as understood by one skilled in the art. Methacrylate embodiments are preferred over acrylate embodiments.

Synthetic methods of organic chemistry are known in the art including for example J. March, *Advanced Organic Chemistry, Reactions, Mechanism, and Structure*, 5$^{th}$ edition, as well as previous editions.

Presently claimed embodiments relate to polymerizable dye comprising a particular type of structure with similar UV and visible light absorption characteristics as the natural human crystalline lens of aged persons. In one embodiment, these compounds or dyes can be polymerized into a polymer matrix of the materials that are used as ocular devices and lenses such as for example eye glasses, sun glasses, contact lenses, and intraocular lenses.

As used herein, alkyl groups can be for example linear, branched, or cyclic alkyl groups. They can be for example C1 to C30 alkyl groups.

As used herein, aryl groups can comprise one or more aromatic rings and can comprise substituents on the rings.

Also, as used herein X or Y denote a substituent comprising a polymerizable vinyl group, an electron donating group, and electron withdrawing group or a combination thereof. The addition of an electron-donating group to the aforementioned chromophores shifts the visible light filtering to longer wavelengths, while an electron withdrawing group shifts the visible light filtering to shorter wavelengths.

In some embodiments, a polymerizable vinyl group can be a part of, or linked to $R_1$, $R_2$, X or Y.

Compound and p-Nitrophenylazo Salicylic Acid, Ester and Ketone

Figure 10:
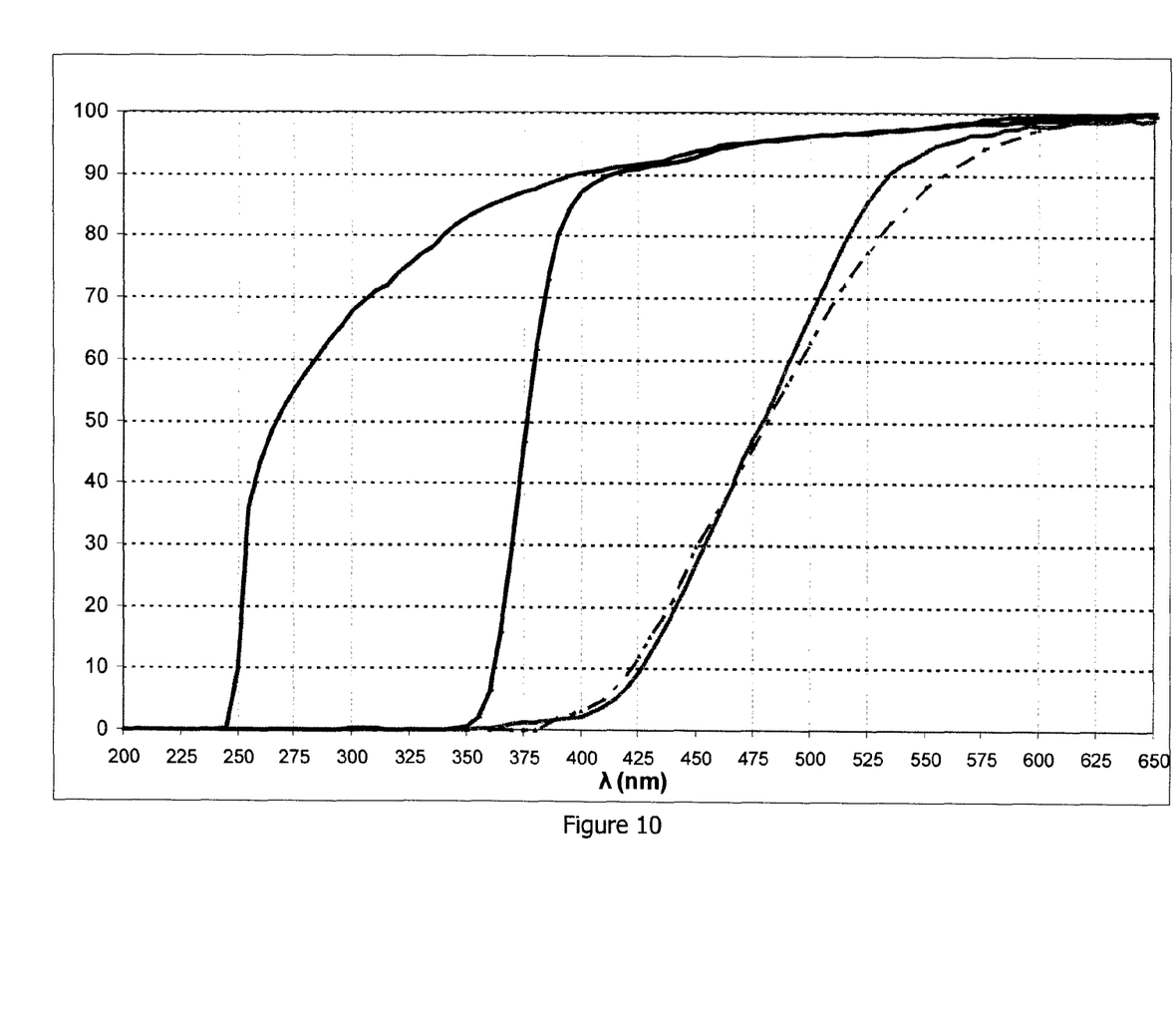
FIG. 10 illustrates transmission spectral properties of various optical materials.

Phenylazo compounds and derivatives thereof function well as dyes exhibiting a range of visible light absorbing characteristics. Particular to this invention is the dye of the generalized structure of FIG. 1 where $R_1$ is an —OH group, $R_2$, X and Y are all hydrogen. This represents the base chromophore structure, p-Nitrophenylazo salicylic acid. This structure has a visible light absorption spectrum that more closely resembles that of an aged human crystalline lens than what has been claimed previously (see for example, U.S. Pat. No. 6,353,069 to Alcon Manufacturing Ltd.). As shown in FIG. 10, this structure provides substantial improvement over other competing materials.

Figure 1:
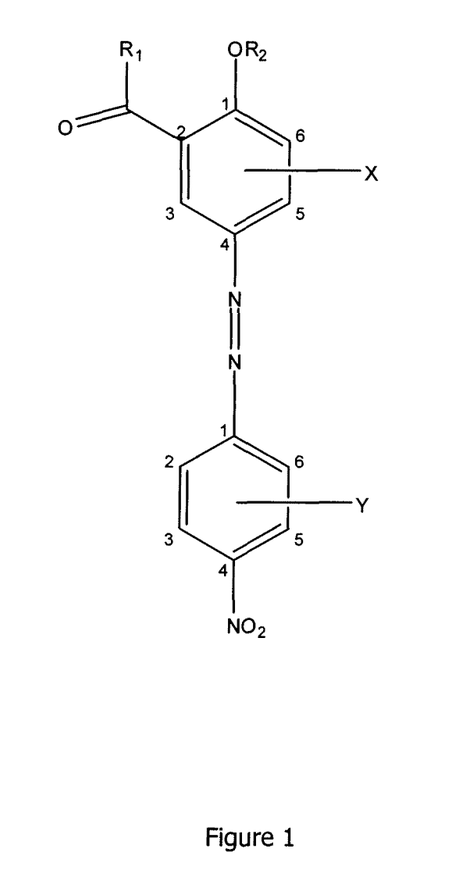
FIG. 1 illustrates a chromophore according to a particular embodiment.

Further, this structure, which comprises a benzene ring with a carboxylic acid, ester or ketone at the 2-position and a p-Nitrophenylazo group at the 4-position can be modified to shift the visible light transmission spectrum to either longer or shorter wavelengths by the addition of the appropriate substituent groups X and/or Y (see FIG. 1.)

The structure in FIG. 1 can be derivatized at positions $R_1$, $R_2$ and/or on either benzene ring with substituents X and Y, to incorporate moieties which allows covalent attachment to a larger polymer matrix. Stated differently, the structure may be derivatized with moieties which can undergo polymerization reactions. FIG. 1 also shows a numbering system for the base aromatic structure comprising a benzene ring and a p-nitrophenylazo group In one example, the carbonyl group is bonded at C2, the oxygen at C1 and the p-nitrophenylazo group at C4. Further, an optional X group can be bonded at C3, C5 or C6. Even further, a Y group can be bonded at the C2', C3', C5' or C6' of the benzene ring of the p-nitrophenylazo group (alternatively referred to as the second benzene ring).

Figure 4:
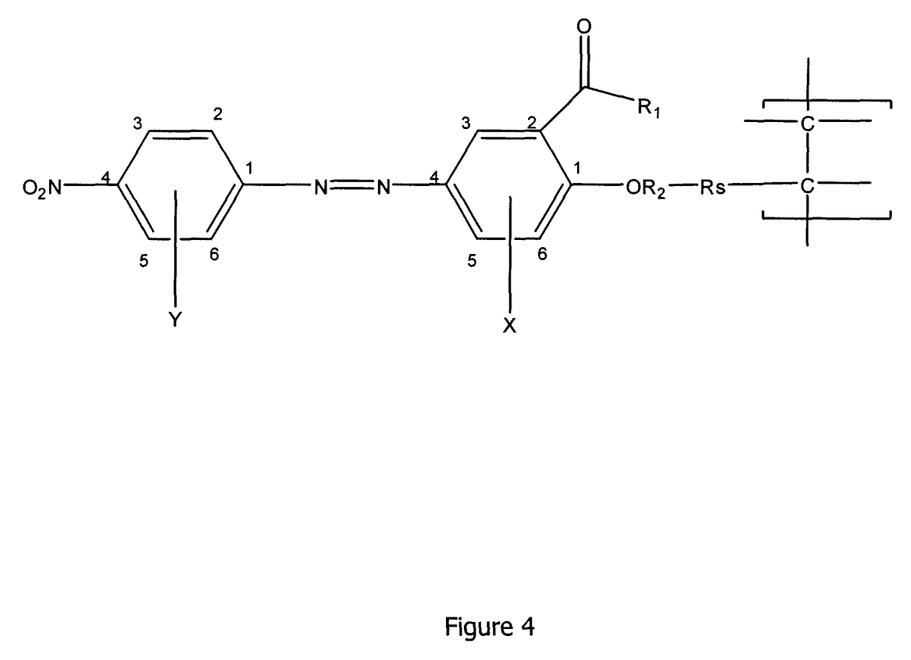
FIG. 4 illustrates a polymer comprising a chromophore.
Figure 7:
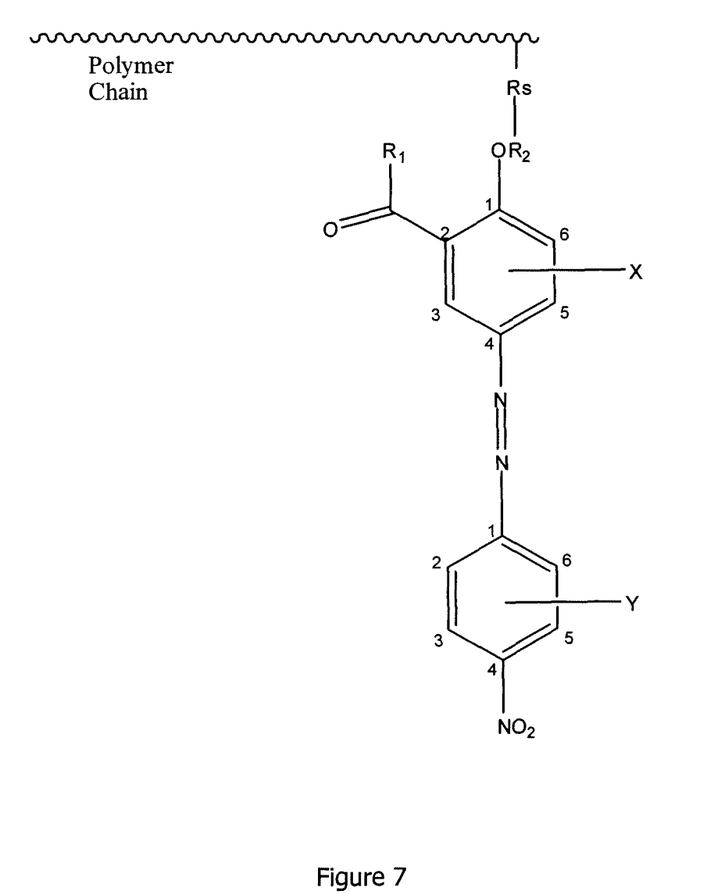
FIG. 7 illustrates a polymer chain linked to a chromophore.

The $R_1$ group of substituent at the 2-position of the benzene ring can comprise any combination of H, O, N or C atoms. However, the $R_1$ group can be adapted so that the absorption properties of the p-Nitrophenylazo salicylic structures are not substantially changed by the $R_1$ group. $R_1$ can be, for example, an alkyl group such as methyl, ethyl or propyl, comprising a ketone at C2. $R_1$ can also be an amino group comprising an amide at C2. $R_1$ can also be an acyl group comprising an ester at C2 or a hydroxyl comprising an acid (salicylic acid at C2). Similar to $R_1$, $R_2$ can comprise one or more of H, O, N or C atoms. For example $R_2$ can be hydrogen, comprising a hydroxyl group at C1 or carbon, comprising an ether or an ester group at C1. R2 can be monovalent, as shown in FIG. 1, or divalent, as shown in FIGS. 4 and 7.

$R_1$ and/or $R_2$ can be linked to a spacer or linker group for further coupling as needed to for example a polymer chain.

The X group is optional and can be linked to the first benzene ring at the 3, 5, or 6 position. The X group can be electron-donating or electron-withdrawing which can be used to tune absorption properties to a desirable range, for a particular application. Increased electron-donation to the ring can shift absorbance to longer wavelengths. In one embodiment, the compound of FIG. 1 comprises at least one electron donating or withdrawing substituent at one or more of the 3-, 5-, or 6-position of the first benzene ring. For example, the electron donating group can be an alkyl group, an —OR group such as alkoxy, or a substituted amino group.

The Y group is also optional and can be linked to the second benzene ring at the 2', 3', 5', or 6' position. Similarly to the X group, the Y group can be electron-donating or electron-withdrawing which can be used to tune absorption properties to a desirable range, for a particular application. The selection of Y group is independent of the X group. That, is the chromophore may comprise an X group, a Y group or both. In one embodiment, the chromophore does not comprise an X or Y group. In one example, the compound of FIG. 1 comprises at least one Y at one or more of the 2'-, 3'-, 5'-, or 6'-position of the second benzene ring.

Electronic donating and withdrawing groups are described in for example J. March, *Advanced Organic Chemistry, Reactions, Mechanism, and Structure,* $5^{th}$ edition, as well as previous editions.

In one embodiment, the compound is represented by Formula I as shown in FIG. 1.

Figure 2:
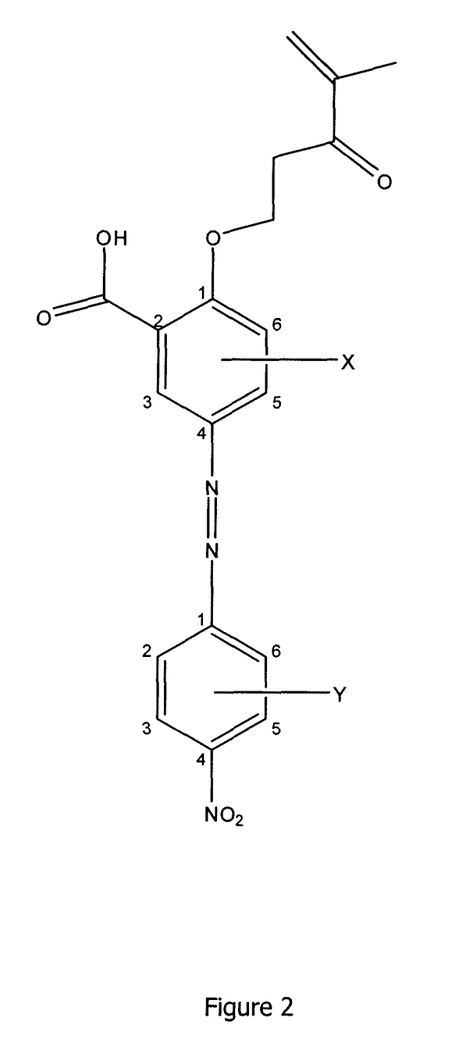
FIG. 2 illustrates a chromophore according to another particular embodiment.

In one embodiment, the compound is represented by Formula II as shown in FIG. 2.

Figure 3:
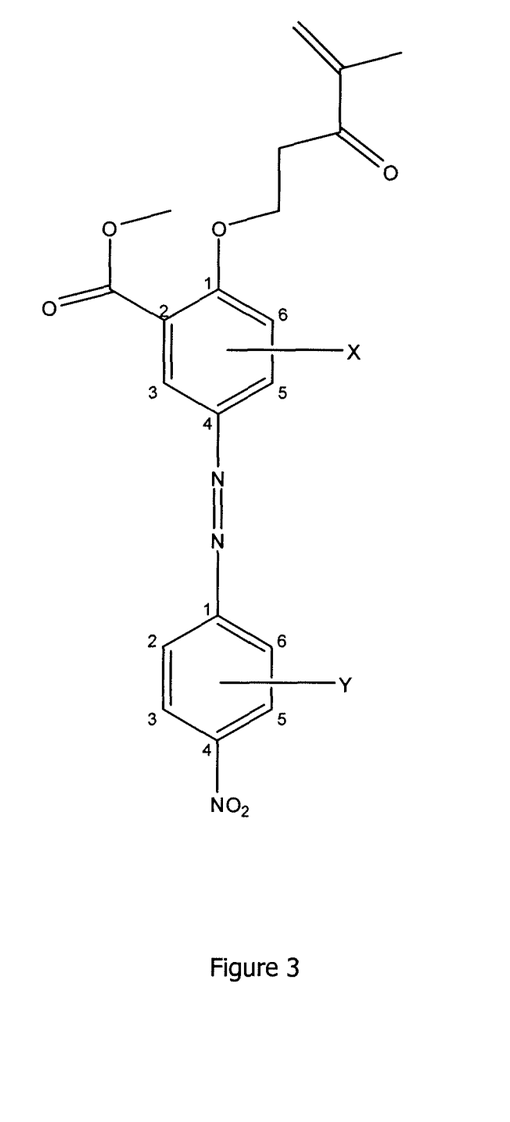
FIG. 3 illustrates a chromophore according to another particular embodiment.

In one embodiment, the compound is represented by Formula III as when in FIG. 3.

In one embodiment, the compound is suitable for use in ophthalmic lenses or devices. For example, the polymerizable compound can be formulated to be compatible and soluble with other monomers and mixtures so that good polymerization and homogeneity can be achieved.

When acidic or basic groups are present that can change form based on pH changes, e.g., become protonated, the groups cover protonated and unprotonated forms, independently of how pH is altered. The present compositions, whether for example monomeric or polymeric, cover salt, acid, and base forms.

Polymerizable Vinyl Group

The polymerizable vinyl group can be linked to the benzene ring via a linker group.

For example, the polymerizable vinyl group can be linked to the benzene ring at the 2-position of the first benzene ring.

Alternatively, the polymerizable vinyl group can be linked to the benzene ring at the 1-position of the benzene ring.

Alternatively, the polymerizable vinyl group can be linked to the benzene ring at the 3-, 5-, or 6-position of the first benzene ring.

Alternatively, the polymerizable vinyl group can be linked to the second benzene ring at the 2'-, 3'-, 5'-, or 6'-position.

In one embodiment, a linker or spacer group connects a polymerizable vinyl group to the chromophore. The linker group can for example provides flexibility to the molecule and separates the chromophore from the polymer backbone. The linker group can be also referred to as a spacer group. The linker group can be for example an alkylene group free of heteroatoms. The linker moiety can be for example a C1 to C20 group, or a C1 to C10 group, or a C2 to C5 group. Alternatively, the linker moiety can comprise one or more heteroatoms such as oxygen as found in for example ethylenoxy or propyleneoxy groups. In one embodiment, for example, the polymerizable vinyl group is linked to the chromophore via an alkylene or alkyleneoxy linker group.

In some cases, the linker or spacer group can be a linear chain of atoms connecting a (meth)acrylamide polymer backbone and the chromophore and comprising for example one, two, three, four, five, or six atoms in the chain. Methylene units (—CH$_2$—) and oxygen atoms can be used. One skilled in the art can adjust the length of the spacer to adapt to the particular need and the other components of the formulation. If the spacer group becomes too large, in some embodiments the mechanical properties become undesirable. The atoms can be for example carbon atoms or can be a heteroatom such as oxygen. The linear chain can comprise substituents such as hydrogen. Examples of spacers include —CH$_2$— and —CH$_2$CH$_2$— and —CH$_2$CH$_2$OCH$_2$CH$_2$—. In the accompanying figures, R$_s$ represents any of the aforementioned spacers.

The polymerizable vinyl group can be polymerized by free radical polymerization methods known in the art including use of initiators. In one embodiment, the polymerizable vinyl group comprises a methacrylate or acrylate moiety.

Covalent Linkage

The polymerizable vinyl group can be directly or indirectly covalently linked to the chromophore including through use of a linker group.

Polymers and Polymerization

Crosslinked polymers, as known in the art, can comprise various different monomeric subunits which can be represented by, for example:

$$-[A]_a-[B]_b-[C]_c-[D]_d- \qquad (I)$$

wherein for example A represents a hydrophilic monomeric subunit; B represents an alkoxyalkyl monomeric subunit, C represents a monomeric subunit comprising a chromophore, and D represents a crosslinker monomeric subunit, and wherein the monomeric subunits are or are not randomly dispersed along the monomer chain. In some cases, some block character can be present in the distribution of monomeric subunits. The polymer chain can be a linear polymer chain apart from the crosslinker subunits which provide covalent or other types of linkage sites between the chains.

The end groups of the copolymer are not particularly limited but can be for example determined by the initiator used and the termination mechanisms present in the copolymerization reaction.

One embodiment is for a polymer which consists essentially of polymer subunits which substantially exclude those ingredients and subunits which compromise the basic and novel properties of the materials.

Polymerization conditions including initiator or catalyst selection can be selected to provide for clean polymerization so that for example there is little if any hydrogen abstraction or chain-transfer.

The hydrophobic and hydrophilic character of the polymer backbone, linker or spacer groups, side groups, and chromophore can be tailored for good compatibility and the desired solubility and swellability.

Monomeric subunits comprising hydrophilic moieties to provide hydrophilic properties are known in the art, see for example U.S. Pat. No. 6,517,750, which is hereby incorporated by reference in its entirety. For example, polar groups can be present comprising for example oxygen or nitrogen atoms, and groups capable of hydrogen bonding. This component facilitates water absorption. The amount of this component, along with amounts of more hydrophobic components, can be adjusted to provide a desired water uptake.

One embodiment makes use of HO—R—MA, wherein R is a spacer group between the HO-hydroxyl and the methacrylate, and R is an alkyl group of, for example, 1 to 6 carbon atoms.

A possible material is 2-HEMA and in particular, highly pure forms of 2-HEMA, e.g, 99.9% pure, as the material may be in the eye for long periods of time. Content of ions and acid should be as close to zero as possible. For example, acidic impurities such as methacrylic acid can result in particle formation over time such as for example calcium phosphate particle formation.

Monomeric subunits which comprise alkoxyalkyl groups are known in the art, see for example U.S. Pat. Nos. 7,067,602 and 6,517,750, which are hereby incorporated by reference in its entirety.

One embodiment makes use of R5-O—R6-MA, wherein R5 and R6 can be independently an alkylene or alkyl group with 1 to 6 carbon atoms, and MA is methacrylate. The presence of this subunit provides advantageous mechanical properties to the polymer.

The amount of this subunit can be adjusted to control the amount of water uptake.

Crosslinker subunits, including acrylates and methacrylates, are well-known in the art. They can be the result of crosslinking of difunctional or trifunctional or even tetrafunctional monomers such as a di(meth)acrylate or a tri(meth)acrylate. The crosslink density can also be controlled to control the amount of water present as well as the mechanical properties.

Monomers which can provide crosslinker subunits can be represented by $R(X1)_n$, wherein R is a core organic group such as a C2, or C3 or C4 or C5 or C6 group, with or without heteroatoms like oxygen, X1 is a reactive group such as acrylate or methacrylate, and n is the number of reactive groups such as 2, 3, or 4.

They can be prepared from a variety of multifunctional olefinic monomers such as, for example, ethyleneglycol dimethacrylate (EGDMA), trimethylol propane trimethacrylate (TMPTMA), trimethylol propane triacrylate (TMPTA), diethyleneglycoldimethacrylate (DiEGDMA), triethyleneglycoltrimethyacrylate (TriEGDMA), and the like. A preferred example is trimethylol propane trimethacrylate.

The amounts of the various subunits can be adapted to provide the requisite balance of optical properties and mechanical properties, including hydrophobicity, clarity, folding ability, refractive index, and the like.

The amounts of the monomers can be adapted for a particular application and are not particularly limited to the extent the desired physical properties can be achieved. For example, the amount of hydrophilic (meth)acrylate subunits can be for example about 50 wt. % to about 80 wt. %, or about 55 wt. % to about 75 wt. %, or about 60 wt. % to about 70 wt. %.

The amount of the alkoxyalkyl (meth)acrylate subunits can be for example about 10 wt. % to about 35 wt. %, or about 15 wt. % to about 30 wt. %.

The amount of the subunits comprising chromophore can be for example about 5 wt. % to about 25 wt. %, or about 10 wt. % to about 20 wt. %.

The amount of the crosslinker can be for example about 0.01 wt. % to about 2.5 wt. %, or about 0.1 wt. % to about 1.5 wt. %, or about 0.2 wt. % to about 1 wt. %.

The amounts of the initiator, before polymerization, is not particularly limited but can be for example about 0.02 wt. % to about 0.15 wt. %, or about 0.05 wt. % to about 0.10 wt. %.

The amounts of the subunits can in many cases be approximated by the amounts of the monomers used to make the polymer.

In one embodiment, the polymer is a polymerized form of the compound represented by Formula I, whether a homopolymer or copolymer. In addition, the polymer can be crosslinked and modified with one or more comonomers.

In one embodiment, the polymer is a polymerized form of the compound represented by Formula II, whether a homopolymer or copolymer. The polymer can be crosslinked and modified with one or more comonomers.

In one embodiment, the polymer is a polymerized form of the compound represented by Formula III, whether a homopolymer or copolymer. The polymer can be crosslinked and modified with one or more comonomers.

Figure 5:
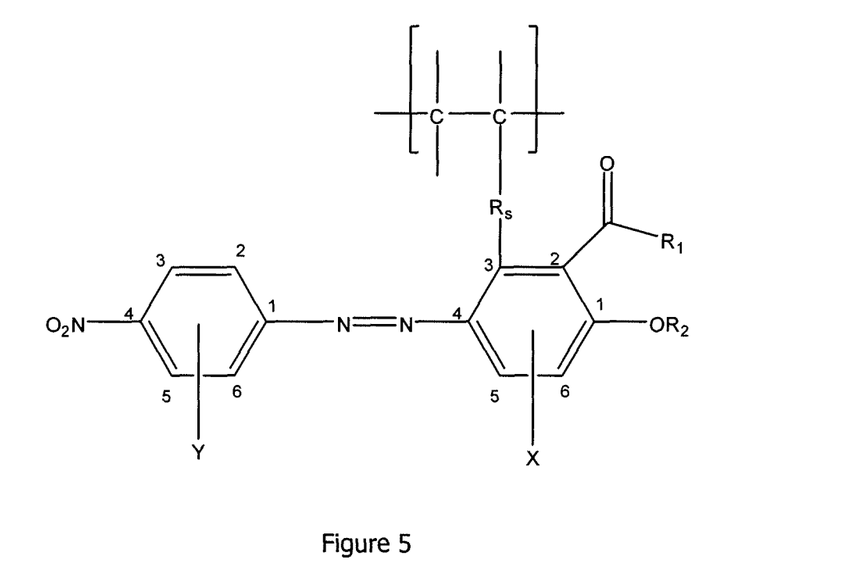
FIG. 5 illustrates another polymer comprising a chromophore
Figure 6:
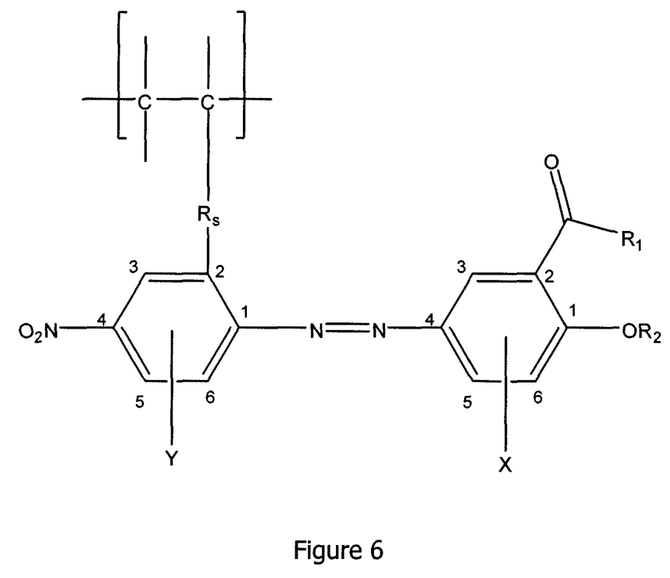
FIG. 6 illustrates another polymer comprising a chromophore.
Figure 8:
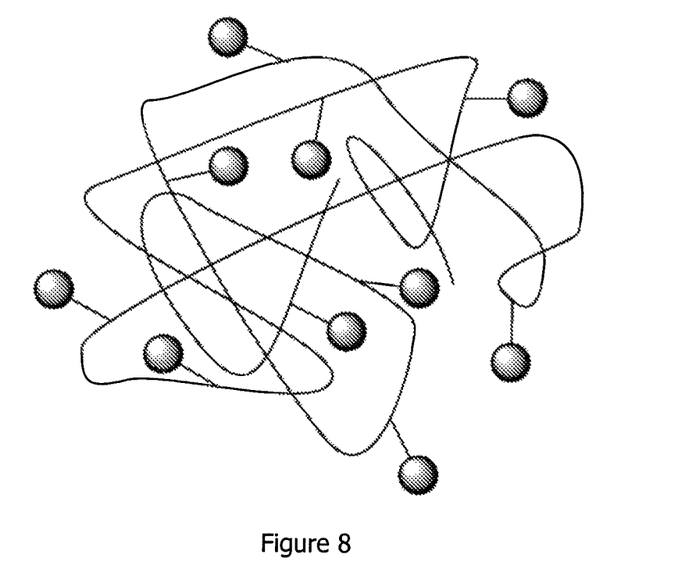
FIG. 8 illustrates another polymer chain comprising a plurality of chromophores (circles).
Figure 9:
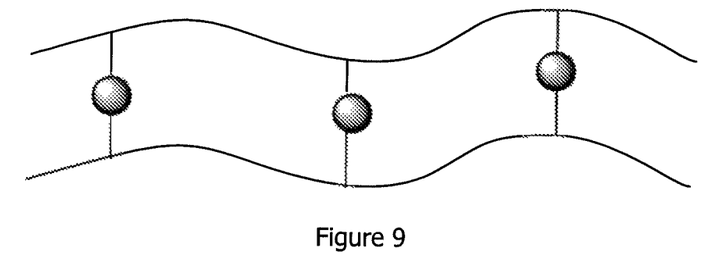
FIG. 9 illustrates two polymer chains crosslinked with a crosslinker comprising a chromophore (circles).

A non-limiting example of a repeat unit of a polymer comprising a chromophore is shown in FIGS. 4, 5, and 6. A broader perspective view of a chromophore linked to a polymer chain is provided in FIG. 7. In these figures, Rs represents a spacer or linker group including a coupling through a linker group R2 as shown in FIGS. 1, 4, and 7. In FIG. 8, a polymer chain comprising a plurality of chromophores (represented by spheres) is shown wherein for example the chromophores are different from each other. FIG. 9 illustrates a special case where a crosslinker between two polymer chains comprises a chromophore as described herein.

In one embodiment, a monomer comprises two or more chromophores.

In another embodiment, a chromophore comprises more than one polymerizable substituent.

FIG. 10 illustrates spectral properties, wherein spectral properties can be taken from a isolated chromophore or from a chromophore bound to an organic moiety or a polymer. The transmission on the left axis can drop off as wavelength is decreased, approaching zero at around 325-400 nm. For example, the composition can transmit less than about 10 percent of light at wavelengths less than about 425 nm. For example, transmission can be determined as a function of wavelength, and each data point can be incorporated into a curve. At certain wavelengths at or above 425 nm, transmission can become greater than about 10 percent. Alternatively, the composition can transmit less than about 10 percent of light at wavelengths between about 425 nm and about 200 nm. Alternatively, the composition can transmit less than about 30 percent of light with wavelengths less than about 450 nm. Alternatively, the composition can transmit less than about 30 percent of light with wavelengths between about 450 nm and about 200 nm. Alternatively, the composition can transmit less than about 50 percent of light with wavelengths less than about 475 nm. Alternatively, the composition can transmit less than about 50 percent of light with wavelength less than about 475 nm about 200 nm. One skilled in the art can use UV-VIS methods known in the art to obtain these parameters.

Methods of Making

Compounds can be made and polymerizations conducted by methods known in the art of synthetic organic chemistry and polymer chemistry.

For example, 2-Ethoxymethacroyl-4(p-Nitrophenylazo)benzoic acid (shown in FIG. 3) can be prepared as follows:

2-Hydroxy-4(p-Nitrophenylazo)benzoic acid (HNB) is commercially available from, for example, Aldrich Chemical Company. Chloroethylmethacrylate (CEMA) is available from, for example, ABCR GmbH & Co. KG or Chemos GmbH. CEMA can be added to HNB under basic conditions to yield the ethoxymethacroyl moiety at the 3-position.

Applications

Suitable applications include compositions adapted for human use. Applications also include an ophthalmic lens or device. The device can be a hard lens, contact lens, intraocular lens, eyeglass, sunglass or other protective eyewear for protecting the retina from UV and violet rays. Other applications include a window, screen and any other non-ophthalmic device for protecting the retina from UV and violet rays.

WORKING EXAMPLES

Additional description is provided by the following non-limiting working examples.

Spectral Properties

FIG. 10 illustrates the blue-blocking effect of 2-Hydroxy-4(p-Nitrophenylazo)benzoic acid. Three transmission spectra are shown of a hydrophilic intraocular lens material including 125 materials available from Benz R&D (Sarasota, Fla.). One comprises a colorless material with no UV blocker (far left curve), one comprises a colorless material with a UV blocker (second from the left), and the third is the 2-Hydroxy-4(p-Nitrophenylazo)benzoic acid (HNB) (second from the right). The dash-dot curve represent the lens material of an aged human. Studies regarding transmission behavior of aged human ocular media are described in Van de Kraats and Van Norren; "Optical density of the young an aging human ocular media in the visible and the UV" J. Optical Society of America A, February 2007. The graph illustrates that the HNB chromophore has significant absorption in the blue region for example at about 400 to 520 nm.

Light Filtering Materials

Physical properties of various intraocular materials, in accordance with certain embodiments, are provided below.

|  | IOL25 Extended Yellow ™ | BenzFlex 26 Extended Yellow ™ |
| --- | --- | --- |
| Water Content % | 25 | 26 |
| Refractive Index |  |  |
| Dry, 20° C. | 1.506 | 1.511 |
| Hydrated, 35° C. |  |  |
| Expansion |  |  |
| Linear | 1.125 | 1.125 |
| Radial | 1.125 | 1.125 |
| Tensile | 62 g/mm² | 92 g/mm² |
| Youngs Modulus | 33 g/mm² | 95 g/mm² |

Example 1

Preparation of
5-(4-Nitrophenylazo)-2-methacryloyloxy Benzoic Acid 5-(4-Nitrophenylazo) salicylic acid A suspension of 50.0 g (174 mmol) of Mordant Orange 1 in 690 ml of pyridine was treated with 155 ml (1048 mmol) of methacrylic anhydride, producing a slurry orange in color. After stirring overnight at room temperature, the slurry was filtered through a 12.5 cm Whatman #4 filter paper, leaving a cake. The cake was then washed with a small volume of pyridine and followed by roughly 300 ml of toluene. This process was performed multiple times, with the toluene washings initially orange but turned virtually colorless. The cake was finally washed with roughly 300 ml of hexane and dried on a Buchner funnel for approximately 15 minutes. The cake was ground with a glass mortar and pestle and subsequently dried in vacuo at room temperature to constant weight to yield 44.0 g (71%) of product as an orange powder. HPLC showed (@ 350 nm detection) the product to be 96.5% pure with Mordant Orange 1 present at 2.1%. At 254 nm detection, pyridine could also be seen @ 18.6%.

What is claimed is:

1. A composition comprising:
   a compound comprising a polymerizable vinyl group covalently linked to a benzene ring-based chromophore comprising:
   a substituent comprising a carbonyl group at the 2-position of the benzene ring;
   a substituent comprising a hydroxy, ether, ester or a combination thereof at the 1-position of the benzene ring; and
   a substituent comprising a p-nitrophenylazo group at the 4-position of the benzene ring, including salts thereof.

2. The composition according to claim 1, wherein the substituent at the 2-position comprises an acid, ester, ketone or a combination thereof, including salts thereof.

3. The composition according to claim 1, wherein the polymerizable vinyl group is linked to the chromophore via a linker group.

4. The composition according to claim 1, wherein the polymerizable vinyl group is linked to the chromophore through the oxygen atom at the 2-position of the benzene ring.

5. The composition according to claim 1, wherein the polymerizable vinyl group is linked to the chromophore through the carbonyl group at the 2-position of the benzene ring.

6. The composition according to claim 1, wherein the polymerizable vinyl group is linked to the chromophore through a ester or ketone functionality at the 2-position of the benzene ring.

7. The composition according to claim 1, wherein the polymerizable vinyl group is linked to the chromophore through the 3-, 5-, or 6-position of the benzene ring.

8. The composition according to claim 1 wherein the polymerizable vinyl group is linked to the chromophore at position-1, the chromophore at position-2 or both.

9. The composition according to claim 1, wherein the polymerizable vinyl group is linked to the chromophore through the 2'-, 3'-, 5'-, or 6'-position of the benzene ring of the p-nitrophenylazo group.

10. The composition according to claim 1, wherein the polymerizable vinyl group is linked to the chromophore through a ketone group at the 2-position of the benzene ring.

11. The composition according to claim 1, wherein the polymerizable vinyl group is linked to the chromophore via an alkylene or alkyleneoxy linker group.

12. The composition according to claim 1, wherein the polymerizable vinyl group comprises a methacrylate or acrylate moiety.

13. The composition according to claim 1, wherein the chromophore comprises at least one electron-donating or electron-withdrawing substituent at the 3-, 5-, or 6-position of the benzene ring.

14. The composition according to claim 1, wherein the chromophore comprises at least one electron-donating or electron-withdrawing substituent at the 2'-, 3'-, 5'-, or 6'-position of the benzene ring of the p-nitrophenylazo group.

15. The composition according to claim 13, wherein the electron donating group is a alkyl group, an —OR group, or a substituted amino group.

16. The composition according to claim 14 wherein the electron donating group is a alkyl group, an —OR group, or a substituted amino group.

17. The composition according to claim 1, wherein the carbonyl group at the 2-position comprises an alkyl group.

18. The composition according to claim 1, wherein an oxygen atom of the group at the 1-position of the chromophore is bonded to an aliphatic carbon atom.

19. The composition according to claim 1, wherein the polymerizable vinyl group is linked to the chromophore via a linker group, and wherein the polymerizable vinyl group is linked to the chromophore at the 1-position of the benzene ring.

20. The composition according to claim 1, wherein the polymerizable vinyl group comprises a methacrylate or acrylate moiety which is linked to the chromophore via an alkylene or alkylenoxy linker group, and wherein the polymerizable vinyl group is linked to the chromophore at the 3-position of the benzene ring.

21. A composition comprising a compound represented by the formula:

said compound comprising at least one polymerizable vinyl group and wherein,

$R_1$ comprises H, O, N, C or a combination thereof;
$R_2$ comprises H, N or C or a combination thereof; and
X and Y each independently comprise H, O, N, C, or a combination thereof, including salts thereof.

22. The composition according to claim 21, wherein the compound is represented by the formula:

wherein X and Y each independently comprise H, O, N, C, or a combination thereof; including salts thereof.

23. The composition according to claim 21, wherein the compound is represented by the formula:

wherein X and Y each independently comprise H, O, N, C, or a combination thereof; including salts thereof.

24. A composition comprising:
a polymer comprising a polymer backbone and at least one side group, wherein the side group comprises a benzene ring-based chromophore comprising:
a substituent comprising a carbonyl group at the 2-position of the benzene ring;

a substituent comprising a hydroxy, ether, ester or a combination thereof at the 1-position of the benzene ring; and a substituent comprising a p-nitrophenylazo group at the 4 position of the benzene ring, including salts thereof.

25. The composition according to claim 24, wherein the polymer is a crosslinked polymer.

26. The composition according to claim 24, wherein the polymer is a crosslinked methacrylate polymer.

27. The composition according to claim 24 wherein said composition transmits less than about 10 percent of light at wavelengths less than about 425 nm.

28. The composition according to claim 24 wherein said composition transmits less than about 10 percent of light at wavelengths between about 425 nm and about 200 nm.

29. The composition according to claim 24 wherein said composition transmits less than about 30 percent of light with wavelengths less than about 450 nm.

30. The composition according to claim 24 wherein said composition transmits less than about 30 percent of light with wavelengths between about 450 nm and about 200 nm.

31. The composition according to claim 24 wherein said composition transmits less than about 50 percent of light with wavelengths less than about 475 nm.

32. The composition according to claim 24 wherein said composition transmits less than about 50 percent of light with wavelength less than about 475 nm about 200 nm.

* * * * *